United States Patent [19]
Jackson

[11] Patent Number: 5,944,098
[45] Date of Patent: Aug. 31, 1999

[54] ZONE CONTROL FOR HVAC SYSTEM

[76] Inventor: Ronald E. Jackson, 1828 Wood Haven Ct., Greenwood, Ind. 46143

[21] Appl. No.: 08/896,133

[22] Filed: Jul. 17, 1997

[51] Int. Cl.$^6$ ........................................................ F24F 3/00
[52] U.S. Cl. ............................................ 165/217; 165/207
[58] Field of Search ...................................... 165/208, 209, 165/217, 201

[56] References Cited

U.S. PATENT DOCUMENTS

| | | |
|---|---|---|
| 3,567,115 | 3/1971 | Nelson . |
| 4,243,174 | 1/1981 | Moeller et al. . |
| 4,460,123 | 7/1984 | Beverly . |
| 4,479,604 | 10/1984 | Didner . |
| 4,754,919 | 7/1988 | Otsuka et al. . |
| 4,830,095 | 5/1989 | Friend . |
| 4,931,948 | 6/1990 | Parker et al. . |
| 4,932,466 | 6/1990 | Foster . |
| 4,997,029 | 3/1991 | Otsuka et al. . |
| 4,997,030 | 3/1991 | Goto et al. . |
| 5,092,394 | 3/1992 | Foster . |
| 5,318,104 | 6/1994 | Shah ........................................ 165/22 |
| 5,413,165 | 5/1995 | Wylie . |
| 5,452,762 | 9/1995 | Zillner . |

*Primary Examiner*—Ira S. Lazarus
*Assistant Examiner*—Lance Chandler
*Attorney, Agent, or Firm*—Locke Reynolds LLP

[57] ABSTRACT

A control assembly for a HVAC system serving a plurality of zones within a structure, having ducting including a damper situated in an outlet of the ducting leading to each zone, a biasing element biasing the damper in a normally open position, and a motor coupled to each damper for closing each damper. A standard manual or automatic change-over thermostat is situated in each of the zones which includes at least a heating signal output and a cooling signal output. The control assembly formed by a collection of diodes and relays includes a pair of relays having a set of normally open contacts coupled between the damper motors and a source of power, one of the pair of relays having a coil coupled to the heating signal outputs of all of the thermostats and another of the pair of relays having a coil coupled to the cooling signal outputs of all of the thermostats so that, upon initiation of a heating or cooling signal from any of the thermostats, power is applied to the motor coupled to each damper for closing each damper. The control assembly includes individual zone controls each of which are formed by a collection of diodes and relays including a first additional relay which has a set of normally closed contacts coupled between the damper motor in the zone and the source of power, and a coil coupled to the heating and cooling signal outputs of the thermostat in the zone so that the initiation of a heating or cooling signal by the zone thermostat opens the normally closed contacts of the first additional relay thus preventing power from being applied to the damper motor leading to the zone thereby permitting the damper to remain open under influence of the biasing element. A second additional relay has a set of normally closed contacts coupled between the cooling signal output of all the thermostats and a control unit controlling the application of power to the cooling unit, and a coil coupled to the heating signal output of all the thermostats so that initiation of a signal from a heating signal output of any of the thermostats prevents the application of power to the cooling unit thus achieving automatic change-over between heating and cooling.

24 Claims, 4 Drawing Sheets

ZONE CONTROL FOR HVAC SYSTEM

BACKGROUND OF THE INVENTION

The present invention is directed generally to residential and small commercial HVAC systems, and more particularly to a low cost control assembly for such systems to control the delivery of forced air to various zones served by a single system which control assembly can be either heating priority responsive or cooling priority responsive.

Typical residences and small commercial buildings are often heated and cooled by a single forced air heating, ventilating, and air conditioning (HVAC) system. In the most basic system, a single thermostat generally placed at a convenient central location senses the temperature at that location and, based on that sensed temperature, can cause the HVAC system to supply heated air or cooled air to the closed structure. Often such closed structures exhibit temperature variations which can often amount to 6 to 8° F., and can be even larger. In order to minimize the temperature variation from one region of the structure to another, various means have been employed to divide a structure into zones to be supplied by different amounts of heated or cooled air.

A very basic approach shown in U.S. Pat. No. 5,413,165, in which heated air from an upper level of a structure is directed to a lower level of a structure during the heating cycle to lessen the heating differentials between the upper and lower level. The flow of air into the individual zones can be manually controlled by switches in each zone as shown in U.S. Pat. No. 4,243,174, however, such a manual control system based on room occupancy fails to address the circumstances of large variations in temperature throughout a residence or small commercial building where all rooms are in use.

A very expensive solution is provided by U.S. Pat. No. 3,567,115 in which a pair of duct systems are created, one carrying hot air and the other carrying cold air, both sources of air being connected to each zone within the structure. While such a system might be satisfactory for certain large commercial situations, it is not generally thought to be economically feasible for residences and light commercial situations.

A number of systems have been developed for controlling the delivery of conditioned air from HVAC systems which employ a master thermostat and a first selected area or zone which is the principal control for the HVAC system. The master thermostat is then coupled to one or more slave thermostats, each of which merely controls a damper admitting air into one of the various zones. The zone controlled by the master unit can be either a permanent selection as disclosed in U.S. Pat. Nos. 4,931,948, 4,932,466, and 5,092,394, or can be subject to later modification through switches or jumpers in a control panel as disclosed in U.S. Pat. No. 4,830,095.

Fairly sophisticated zone controls employing highly programmable, solid state controls which permit a variable amount of air volume into each of the zones as shown in U.S. Pat. Nos. 4,997,029, 4,997,030, 4,754,919, 4,479,604, and 4,460,123. Such programmable systems tend to be fairly expensive at the time of initial purchase and are subject to rather catastrophic failure as a result of voltage or current spikes occurring through the power system due to lightning strikes or other electrical interference.

Accordingly, it is an object of the present invention to provide a low cost zone control system for controlling a HVAC system providing forced air into a single duct leading to a number of zones in which air is admitted past an open damper which may be closed by a control system incorporating a thermostat in each zone, each thermostat being of equal stature with regard to the system, the system being either heating priority responsive or cooling priority responsive.

SUMMARY OF THE INVENTION

The present invention is employed in combination with a forced air system including a heating unit, a cooling unit, a fan, and ducting connecting the forced air system to a plurality of zones within a structure. The ducting includes at least one outlet into each zone with a damper situated in the outlet of the ducting leading to each zone with a motor coupled to each damper for changing the position of the damper. The present invention employs thermostats which are situated in each of the zones having at least a heating signal output and a cooling signal output, all of the thermostats being of the same type. A first relay includes a set of contacts coupled to the damper motor and to a source of power sufficient to change the position of the damper. The first relay also includes a coil coupled to the heating and cooling signal outputs of the thermostat in the zone so that the initiation of either a heating or cooling signal by the thermostat in a selected zone affects the delivery of power to the damper motor. A second relay is provided which includes a set of contacts coupled between all of the cooling signal outputs of all of the thermostats and a control unit controlling the application of power to the control unit. The second relay also includes a coil coupled to the heating signal output of all of the thermostats so that the initiation of a signal from the heating signal output of any of the thermostats prevents the application of power to the cooling unit. Thus, if one of the zone thermostats calls for heating and another zone thermostat calls for cooling, the heating thermostat will take priority and the system will initially operate in a heating mode. When the thermostat that is calling for heating is satisfied, the system will switch over to cooling and supply cooled air to the zone seeking cooling.

In an alternative embodiment, another second relay can be provided which includes a set of contacts coupled between all of the heating signal outputs and a controlled unit controlling the application of power to the heating unit and also includes a coil coupled to the cooling signal output of all of the thermostats so that initiation of a signal from a cooling signal output of any of the thermostats prevents application of power to the heating unit. Such a system is cooling priority responsive and can be employed in warm weather areas of the country as an alternative to the heating priority system previously described.

In a further alternative embodiment, a switch can be included which exclusively selects which of the second relays is to be operative and disables the other so that the system may be switched between heating priority responsive and cooling priority responsive.

Control of the damper may be simplified by providing a bias element for biasing the damper toward either a fully open or closed position with the motor coupled to the damper acting against the influence of the biasing element. In the preferred embodiment, the damper is biased toward an open position so in the absence of any heating or cooling demand from any thermostat, the system is free to distribute and circulate air by mere application of power to the fan. The fan is controlled by appropriate relays which couple the fan to a source of power in the event of either a heating signal or a cooling signal output from any of the thermostats. An additional relay is provided between the first relay coil and the cooling signal output of the thermostats in each zone so the first relay cannot simultaneously receive the output signals from both the heating signal output and the cooling signal output. This prevents any ambiguity and assures that the selected priority will be followed.

An important feature of the present invention is that the desired sequence of operation of heating priority and/or cooling priority is accomplished using a plurality of diodes and relays arranged to perform all of the logic functions without any microprocessor which might be subject to radio frequency interference or current or voltage spikes from line fluctuations, lightning, or the like. The use of such diode and relay logic also makes the overall system more reliable at lower cost because it allows the use of standard heat and cool thermostats rather than the special master and slave thermostats required by most other diode and relay logic zone control systems.

Various additional features and advantages of the present invention will become apparent to those skilled in the art upon studying the following description of the preferred embodiment coupled with the accompanying figures illustrating the best mode of carrying out the invention.

DESCRIPTION OF THE PREFERRED EMBODIMENTS

Figure 1:
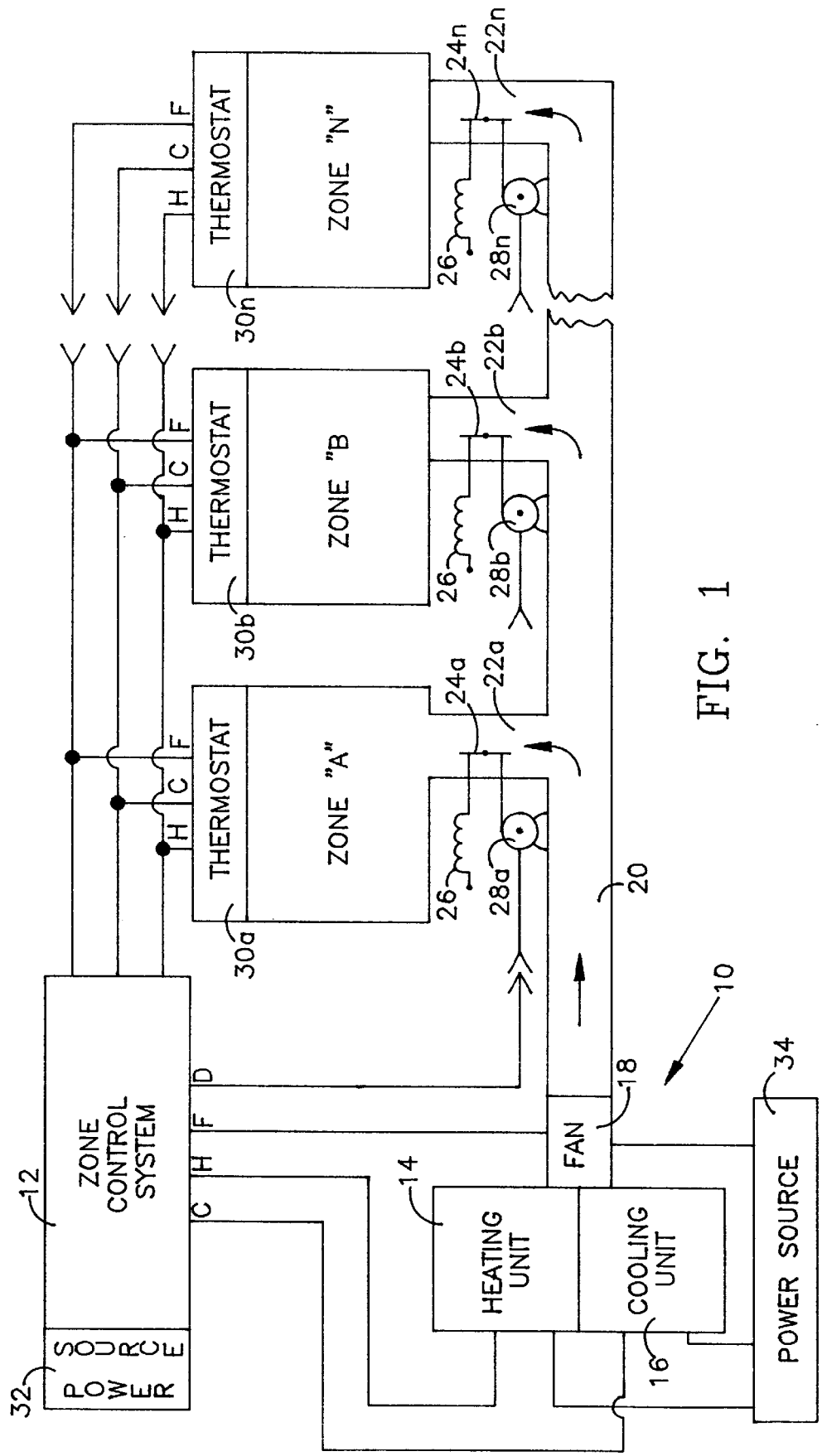
FIG. 1 is a block diagram showing a HVAC system delivering forced air to a plurality of zones and employing a zone control system in accordance with the present invention.

An HVAC system 10 which can be controlled using a zone control system 12 in accordance with the present invention is shown in block diagram form in FIG. 1. The HVAC system includes a heating unit 14 and a cooling unit 16 as well as a fan 18 coupling the heating and cooling units to a duct system 20. The duct system has a plurality of outlets 22*a*, 22*b* . . . 22*n*. The flow of air from duct system 20 through each outlet 22 is controlled by a plurality of dampers 24*a*, 24*b* . . . 24*n*. Each damper 24 is biased toward an open position, as illustrated, by a bias means such as a spring 26. A motor 28*a*, 28*b* . . . 28*n* is coupled to each damper 24 for closing the damper 24 against the influence of spring 26. Each of the outlets 22 leads to a single zone A, B . . . N. While in theory the number of zones is not limited, from a practical point of view, the heating and cooling of more than 10 zones is unlikely, and more probably the number of zones will be constrained to six or less.

A thermostat 30*a*, 30*b* . . . 30*n* is situated within each zone. Each of the thermostats 30 is identical to the other thermostats and can either be a standard manual or automatic change-over thermostat having a heating signal output H, a cooling signal output C, and a fan signal output F. Each of the outputs H, F and C can be a 24-volt signal capable of being applied to a relay coil for the purpose of opening or closing a relay to which it is connected. The outputs H, C and F of the thermostats 30 are all coupled to a zone control system 12 powered by a source of power 32 which can be a conventional 24-volt AC transformer. The zone control hereinafter detailed has four outputs, namely, C, H, F, and D. Output C controls the application of power from power source 34 to cooling unit 16. The power source 34 is a conventional source of typically 220-volt AC. Similarly, the signal H controls the application of power from power source 34 to heating unit 14 while output F controls the application of power from power source 34 to fan 18. An additional output D controls the application of power to the damper motors 28*a*, 28*b* . . . 28*n*, but the application of such power is dependent upon the nature of the forced air being supplied by the HVAC system 10 and the nature of the air desired as signalled by any particular thermostat 30.

Figure 2:
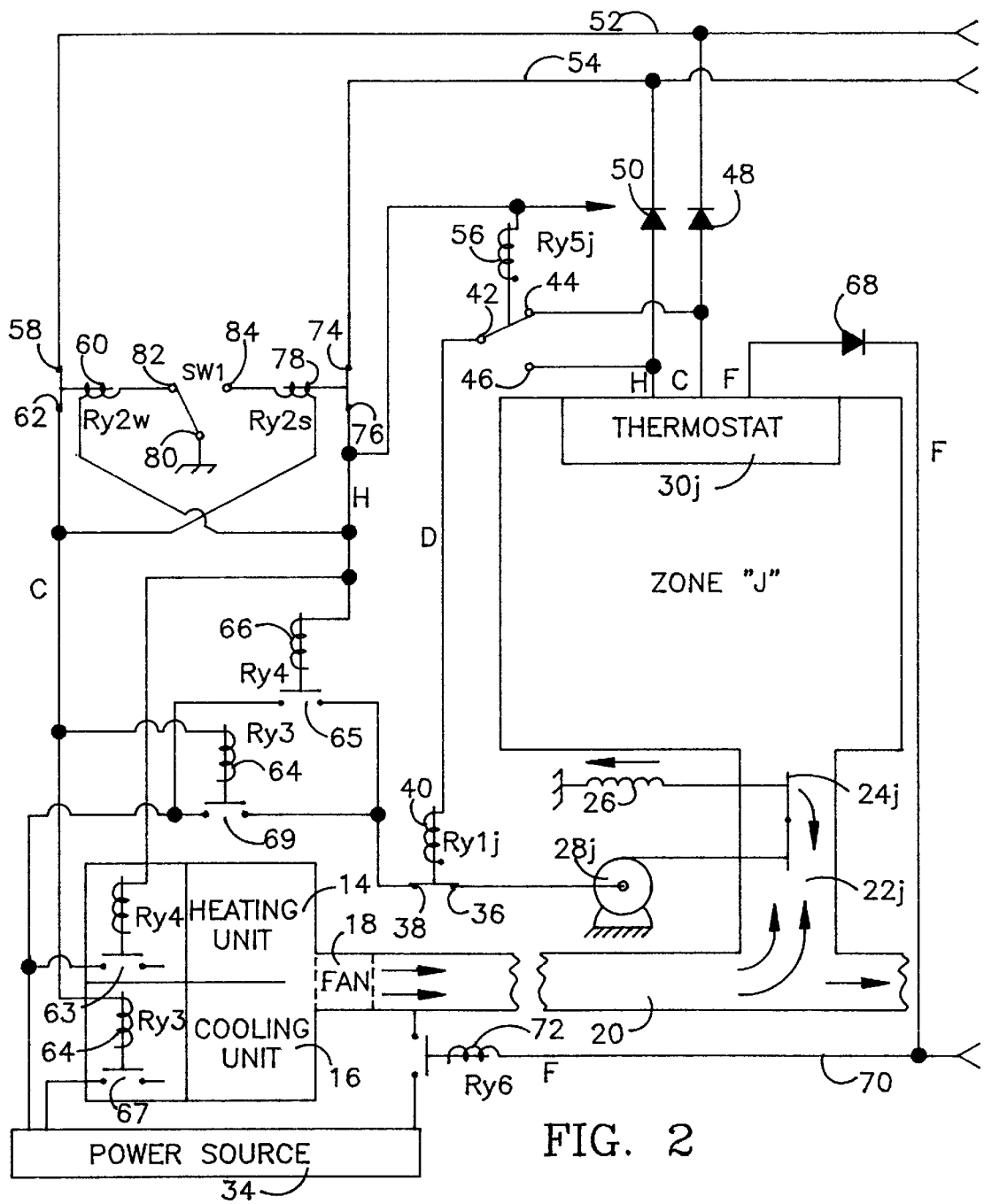
FIG. 2 is a schematic diagram of a representative zone and the system of diodes and relays allowing for the control of the HVAC system with respect to that zone.

Additional details of the zone control system 12 can be seen in FIG. 2 which illustrates the zone control system in connection with a representative zone J which is intended to represent any of the zones A through N of FIG. 1. The same reference numerals have been used in both FIGS. 1 and 2 to refer to the same functional elements of the system. In FIG. 2, the zone control system 12 includes a first normally closed relay Ry1*j* which includes a first terminal 36 connected to damper motor 28 and a second terminal 38 coupled to sources of power which, under appropriate circumstances described below, can supply power to motor 28*j* to cause the damper 24*j* to close. In the absence of any power being applied to contact 38, motor 28*j* will not be energized and the damper 24*j* will be maintained in an open position by virtue of the bias supplied by spring 26. The contacts 36 and 38 are normally coupled together by the relay in the absence of any power being applied to the coil 40.

Coil 40 is connected to the output terminal 42 of relay Ry5*j* which is a single pole, double throw relay normally connecting the output terminal 42 to the cooling signal output C of thermostat 30*j* coupled to terminal 44. The heating signal output of thermostat 30*j* is coupled to terminal 46 of relay Ry5*j*. The output signals C and H from thermostat 30*j* are also supplied through diodes 48 and 50, respectively, to common bus lines 52 and 54 which are coupled in a similar manner to all other thermostats 30 coupled to the zone control system. The diodes 48 and 50 effectively prevent any heating or cooling signal from a thermostat other than 30*j* from being present on either terminals 44 or 46 of relay Ry5*j*. Thus, terminals 44 and 46 of relay Ry5*j* reflect merely the output of thermostat 30*j* and, as a result, any power applied to coil 40 of relay Ry1*j* is derived merely from thermostat 30*j*. Thus, if thermostat 30*j* is not calling for either heated or cooled air, terminals 38 and 36 of relay Ry1*j* will be coupled together with at least the possibility of power being applied to damper motor 28*j*.

If thermostat 30*j* calls for cooling of zone J by a cooling signal being applied to terminal 44 through relay Ry5*j* to terminal 42, the signal will cause coil 40 of relay Ry1*j* to be energized thereby breaking the contacts between terminals 36 and 38 assuring that no power can be applied to damper motor 28*j* which in turn guarantees that damper 24*j* will remain in its biased open position as shown.

Similarly, if thermostat 30*j* calls for heating, the heating signal will be applied through bus 54 to coil 56 of relay Ry5*j* which will open the contacts between terminals 42 and 44 and close the contacts between terminals 42 and 46 thereby applying the heating signal through terminals 46 and 42 to coil 40. Once again, the application of the heating signal from thermostat 30*j* will cause coil 40 of relay Ry1*j* to be energized which again breaks the contact between terminals 36 and 38 of relay Ry1*j* preventing power from being applied to damper motor 28j which, in turn, insures that damper 24j will remain in the illustrated open position under the influence of biasing spring 26.

The cooling signal bus 52 is connected to terminal 58 of normally closed relay Ry2w. The presence of a cooling signal from any thermostat 30 will cause a signal to be applied to bus 52 which directs the signal to contact 58. Coil 60 of relay Ry2w is coupled to the heating bus 54. Terminal 62 of relay Ry2w is coupled to coil 64 of relay Ry3. In the absence of any heating signal from any thermostat 30, no power will be applied to coil 60 and thus terminal 58 will be coupled to terminal 62 and any cooling signal traveling through bus 52 will be applied to coil 64 of relay Ry3.

Relay Ry3 is a normally open, double pole single throw relay which when closed by an application of power to coil 64 applies power from power source 34 through terminals 67 to cooling unit 16 and through terminals 69 to terminal 38 of relay Ry1. It will be recognized that if Ry1j is in its closed position, as shown, the application of power will cause damper 24j to close. This is a circumstance where a cooling signal is being called for by a thermostat other than thermostat 30j, and no cooling signal is being called for by thermostat 30j. If thermostat 30j is calling for cooling, then the signal from the output of thermostat 30j will be applied through terminals 44 and 42 of relay Ry5j to coil 40 of relay Ry1j breaking the connection between terminals 36 and 38 of Ry1j thus preventing the power controlled by relay Ry3 from proceeding beyond terminal 38. This allows the damper 24j to remain open, or return to its open position, thereby supplying cool air from the cooling unit through duct 40 and opening 22j to zone J.

If a heating signal arises on bus line 54 from any source, the heating signal will be supplied to coil 60 of relay Ry2w thus breaking the connection between terminals 58 and 62 of relay Ry2w which will prevent the application of power through relay Ry3 to either the cooling unit 16 or the damper motors 28. Instead, the heating signal on bus 54 is applied to coil 66 of relay Ry4. Relay Ry4 is a normally open, single throw double pole relay which controls the application of power from power source 34 through terminals 63 to the heating unit 14 and through terminals 65 to terminal 38 of relay Ry1j. The heating signal is also supplied, as previously described, to coil 56 of relay Ry5j which breaks the connection between terminals 42 and 44 and makes the connection between terminals 42 and 46. If the heating signal on bus 54 is not supplied from thermostat 30j, then the application of power through relay R4 will be applied through terminals 38 and 36 of relay Ry1j to close damper 24j. If thermostat 30j is emitting a heating signal, then the heating signal will be transmitted through terminals 42 and 46 of relay Ry5j to coil 40 of relay Ry1j thus breaking the connection between terminals 36 and 38 of relay Ry1j to prevent the application of power to the damper motor 28j thus assuring the damper 24j will remain open, or return to an open position, to permit the supply of heat from heating unit 14 through duct 20 and opening 22j to zone J.

In the absence of any cooling or heating signal on either bus 52 or 54, respectively, any thermostat 30 may be switched to call for mere air circulation through the initiation of a fan output signal through terminal F and diode 68 to bus 70 connected to coil 72 of relay Ry6. Relay Ry6 is a normally open, single pole single throw relay which closes in response to any fan signal from any of the thermostats 30. The closing of the contacts of relay Ry6 causes power to be supplied from the power source 34 to fan 18. It will be appreciated that the application of power through either relay Ry3 or relay Ry4 to the cooling unit 16 or the heating unit 14, respectively, will also cause the fan 18 to be powered through a circuit, not shown.

An optional relay Ry2s can be supplied to control the flow of the heating signal from bus 54 through terminals 74 and 76 to coil 66 of relay 4. It is to be noted that terminals 74 and 76 can merely be tied together by a jumper wire to permit the system to operate in a heating priority responsive mode as previously described. By the addition of relay Ry2s, the system can be made to be a cooling priority responsive system. Relay Ry2s is a normally closed relay which has a coil 78 coupled to cooling signal bus 52. Switch SW1 is a single pole, double throw switch which, alternatively, connects grounded terminal 80 to either terminal 82 connected to coil 60 of relay Ry2w or to terminal 84 connected to coil 78 of relay Ry2s. If a cooling signal present on cooling bus 52 is applied to coil 78, but coil 78 is not connected to common or ground, as shown in FIG. 2, no action whatsoever will be observed in the armature of relay Ry2s, and thus terminals 74 and 76 will remain connected. If the coil 78 is connected to ground through switch SW1, then the presence of a cooling signal on line 52 will cause coil 78 to be energized thus breaking the connection between terminals 74 and 76 of relay Ry2s to prevent application of any heating signal from bus line 54 from being applied to relay Ry4. The breaking of the connection between terminals 74 and 76 of relay Ry2s also prevents application of a heating signal from bus 54 to coil 60 of relay Ry2w, thus assuring continued continuity between terminals 58 and 62.

It will be appreciated by those skilled in the art that a cooling responsive system can be achieved by merely having relay Ry2s as illustrated while tying terminals 58 and 62 together with a jumper wire, in which case relay Ry2w can be eliminated from the system. It will also be appreciated by those skilled in the art that when the system is operated in the heating priority mode shown in FIG. 2, the breaking of the connection between terminals 58 and 62 of relay Ry2w also prevents application of a cooling signal from bus 52 to coil 78 of relay Ry2s, thus assuring continued continuity between terminals 74 and 76.

Figure 3A:
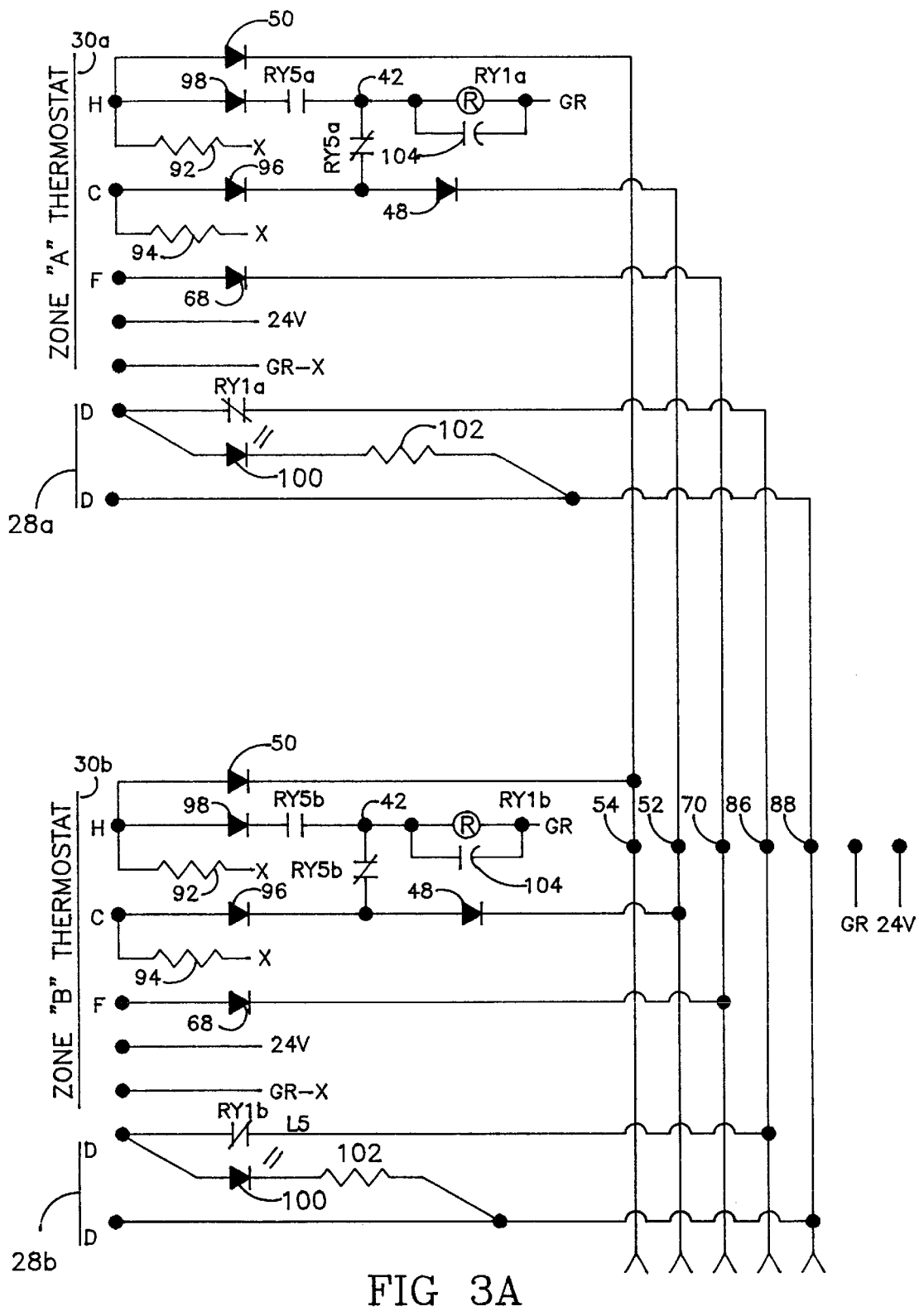
FIGS. 3*a* and 3*b*, taken together, is a schematic drawing of the zone controller instructed in accordance with the present invention and adapted to be coupled to a HVAC system having a plurality of motorized dampers controlling the distribution of the air into the zones serviced by the system.
Figure 3B:
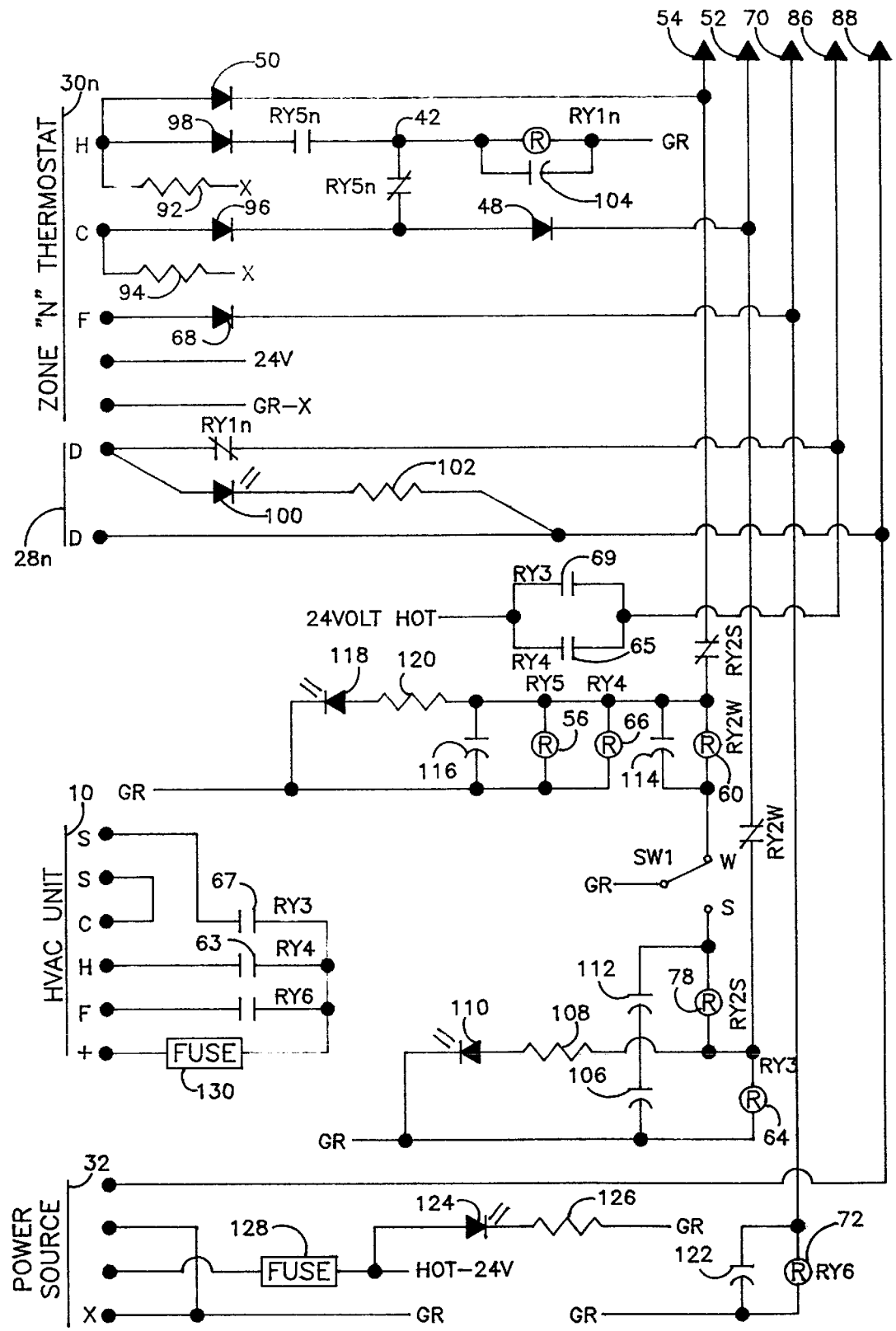

While FIG. 2 graphically illustrates the invention with respect to a single representative zone J, it does not show the entirety of a circuit capable of controlling a plurality of zones. A practical circuit is shown schematically in FIGS. 3a and 3b which is adapted to control three zones. It will be appreciated that theoretically any number of the units shown in FIG. 3a could be coupled to the unit shown in FIG. 3b to add any number of zones to the system, but practical limitations to the operation of the system generally require that no more than ten and usually no more than six zones are controlled by a control system of the present invention. In FIGS. 3a and 3b, the same reference numerals have been used as in both FIGS. 1 and 2 to refer to the same functional elements of the system.

FIG. 3a schematically depicts the connections to be made between thermostats in zone A and zone B with the control system of the present invention. The circuit connected to each thermostat is functionally identical and is wired to a bus system including the cooling signal bus 52, the heating signal bus 54, and the fan signal bus 70. Additionally, there is a 24 volt source and a common ground as well as a bus pair 86 and 88 devoted specifically to the damper motors 28. Each of the thermostats 30 is a conventional thermostat having a connection for a continuous 24 volt source, a ground, a heating signal output, a cooling signal output and a fan signal output. The two outputs designated D are not connected to the thermostat, but rather to the damper motor 28 in the particular zone. Resistor 92 and resistor 94 are, preferably, 1,000 ohm, 2-watt load resistors which provide sufficient current requirements to assure proper operation of any triac or heat anticipator which might be present in any of the thermostats 30. The output of the cooling signal and the output of the heating signal which leads to relay Ry5 include optional diodes 96 and 98 which act to prevent any stray signal from proceeding backward through the system from relay Ry5 to affect the 24-volt source 32 shown in FIG. 1.

A photo emitting diode 100 and resistor 102 bridge the two terminals connected to the damper. The resistor 102 is a voltage divider resistor typically having a value of about 33,000 ohms so that the voltage drop experienced across the photo diode 100 is appropriate to permit it to emit light when power is applied to the damper bus 86 and the particular relay Ry1a or Ry1b or . . . Ry1n remains in a closed condition. The capacitor 104 which is in parallel with the coil of each of the relays Ry1 is typically about 22 microfarads to insure chatter-free operation of the relay.

As shown in FIG. 3b, the damper motor bus 86 can be supplied power by way of closing either the normally open contacts 69 on either relay Ry3 that serves the cooling unit or the normally open contacts 65 on relay Ry4 which serves the heating unit. The coil 64 of relay Ry3 is connected to the cooling signal bus 52 through the terminals of relay Ry2w. A capacitor 106, typically 22 microfarads, is placed in parallel with coil 64 of relay 3 to provide chatter-free operation. A voltage divider resistor 108, typically 33,000 ohms, and a light emitting diode 110 are also placed in parallel with coil 64 to signal the operation of the cooling unit 16. The optional relay Ry2s coil 78 can be coupled to the hot side of relay Ry3 in parallel with a smoothing capacitor 112 of typically 22 microfarads. It will be seen that this relay is inoperative unless switch Sw1 is switched from the illustrated position to connect the ground to the S-pole to enable relay Ry2s and disable relay Ry2w.

The cooling unit 16 of the HVAC unit 10 is powered, either directly or indirectly, upon the closing of contacts 67 of relay Ry3. Power derived from terminal + is directed through fuse 130 and closed contacts 67 to one of the terminals S coupled to the HVAC unit 10. The two terminals S of the HVAC unit 10 can be coupled to a discharge air temperature sensor located within ducting 20, not shown, which prevents application of any power to the cooling unit 16 until the temperature within the ducting drops below a selected temperature, for example 35° C. If the HVAC unit 10 does not have a discharge air temperature sensor, the two terminals S are tied together with a jumper wire to permit the direct application of power from the contacts 67 to terminal C on the HVAC unit 10.

Coil 60 of relay Ry2w is coupled by way of the contacts of relay Ry2s, when present, to the heating bus 54 and in parallel with smoothing capacitor 114, also typically 22 microfarads. The heating bus 54 is also connected to the coil 66 of relay Ry4 which controls the application of power to the heating unit. The coil 56 of relay Ry5 is also coupled to the heating bus 54. Only one coil 56 for relay Ry5 is shown in FIG. 3b since the relay Ry5 can have multiple sets of contacts, i.e., three pole double throw, to achieve all of the switching necessary for a multiplicity of zones. Alternatively, a number of relay coils 56 can be inserted in parallel as long as the power supplied by heating bus 54 is sufficient to take the load of the added relay coils. From a cost consideration, a multiple of double pole, double throw relays may be preferable to a single quad pole double throw relay. In addition to smoothing capacitor 116, the size of which might vary with the number of relay coils in the circuit, light emitting diode 118 and divider resistor 120, also 33,000 ohms, are provided for an indication of the operation of the heating unit 14 of the HVAC system 10. The heating unit 14 of the HVAC unit 10 is powered, either directly or indirectly, upon the closing of contacts 63 of relay Ry4. Power derived from terminal + is directed through fuse 130 and closed contacts 63 to the terminal H of the HVAC unit 10.

The coil 72 of fan relay Ry6 also has a smoothing capacitor 122 of typically 33 microfarads in parallel. Finally, a light emitting diode 124 is coupled in series with a 33,000 ohm voltage divider resistor 126 and coupled to the control system power supply through fuse 128 to provide an indication that power has been applied to the entire control assembly of the present invention. To operate the fan independently of either the heating or cooling units, power derived from terminal + is directed through fuse 130 and the closed contacts of relay Ry6 to the terminal F of the HVAC unit 10.

While the present invention has been described with reference to the illustrated specific embodiments, other embodiments, based on the principles of the present invention using diode and relay logic, should occur to those of ordinary skill in the art. For example, while contacts 67 and 63 of relays Ry3 and Ry4 are shown to control the application of power to the cooling and heating units, respectively, control can be achieved through still further relays operated by the relays Ry3 and Ry4 having sufficiently heavy duty contacts to carry the significant current loads of the heating and cooling circuits. Such embodiments are intended to be covered by the following claims.

What is claimed is:

1. A control assembly for controlling a forced air system including a heating unit, a cooling unit, a fan, and ducting connected thereto for delivering air, which may be heated or cooled, to a plurality of zones within a structure, the control assembly comprising a plurality of zone controls, each zone control comprising:

a thermostat situated in each of said zones including at least a heating signal output and a cooling signal output, a damper situated in an outlet of said ducting leading to each zone, and a motor coupled to each damper for changing the position of each damper, and a first relay including a set of contacts coupled to the damper motor and to a source of power sufficient to change the position of the damper, the first relay also including a coil coupled to the heating and cooling signal outputs of the thermostat in said zone so that the initiation of a heating or cooling signal by the thermostat in the selected zone affects the delivery of power to the damper motor, the control assembly also comprising:

at least one second relay including a set of contacts coupled between all the cooling signal outputs and a control unit controlling the application of power to the cooling unit, said at least one second relays also including a coil coupled to the heating signal output of all the thermostats so that initiation of a signal from a heating signal output of any of the thermostats prevents the application of power to the cooling unit.

2. The control assembly of claim 1 wherein another of said at least one second relays includes a set of contacts coupled between all the heating signal outputs and a control unit controlling the application of power to the heating unit, and also includes a coil coupled to the cooling signal output of all the thermostats so that initiation of a signal from a cooling signal output of any of the thermostats prevents the application of power to the heating unit, and a switch for exclusively selecting which of said at least one second relays is to be operative.

3. The control assembly of claim 1 wherein the zone controls for at least one zone further comprises a biasing element biasing the damper toward a first selected position controlling air flow from the ducting into each zone, said motor coupled to said damper acting against the influence of the biasing element.

4. The control assembly of claim 3 wherein said set of contacts of the first relay in said at least one zone comprises a set of normally closed contacts whereby power from said source of power maintains said damper in a second selected position, and so that the initiation of a heating or cooling signal by the thermostat in the selected zone opens the normally closed contacts of the first relay removing power from the motor coupled to the damper leading to the selected zone thereby permitting the damper to change position under influence of the biasing element.

5. The control assembly of claim 4 wherein said biasing element biases said damper toward an open position permitting air to flow from the ducting into said at least one zone.

6. The control assembly of claim 1 further comprising a third relay including a set of normally open contacts coupled between said source of power and said set of contacts on at least some of the first relays, the third relay also including a coil coupled to the heating signal output of a plurality of the thermostats so that initiation of a signal from a heating signal output of any of said plurality of the thermostats applies power from said source of power to said set of contacts on said at least some of the first relays.

7. The control assembly of claim 6 wherein said third relay further comprises a set of contacts coupled to said fan and to a source of power so that a flow of air through said ducting is caused by said fan whenever a signal initiates from the heating signal output of any of said plurality of the thermostats.

8. The control assembly of claim 1 wherein said control unit controlling the application of power to the cooling unit further comprises a fourth relay including a set of normally open contacts coupled between said source of power and said set of contacts on a group of the first relays, the fourth relay also including a coil coupled to the cooling signal output of a selection of the thermostats so that initiation of a signal from a cooling signal output of any of said selection of the thermostats applies power from said source of power to said contacts on said group of the first relays.

9. The control assembly of claim 8 wherein said fourth relay further comprises a set of contacts coupled to said fan and to a source of power so that a flow of air through said ducting is caused by said fan whenever a signal initiates from the cooling signal output of any of said selection of the thermostats.

10. The control assembly of claim 1 further comprising a fifth relay including a first set of contacts normally positioned in a first position coupled between the first relay coil and the cooling signal output in each zone, a second set of contacts normally positioned in a position opposite said first position coupled between the first relay coil and the heating signal output in each zone so that the first relay coil cannot simultaneously receive output signals from both the heating signal output and cooling signal output.

11. The control assembly of claim 1 further comprising a venting signal output on at least some of said thermostats, and a sixth relay including a set of contacts coupled to said fan and to a source of power sufficient to cause a flow of air through said ducting, the sixth relay including a coil coupled to the venting signal output on said at least some of said thermostats so that air is caused to flow through said ducting when a venting signal is output from any of said at least some of the thermostats.

12. A control assembly for controlling a forced air system including a heating unit, a cooling unit, a fan, and ducting connected thereto for delivering air, which may be heated or cooled, to a plurality of zones within a structure, the control assembly comprising a plurality of zone controls, each zone control comprising:

a thermostat situated in each of said zones including at least a heating signal output and a cooling signal output, a damper situated in an outlet of said ducting leading to each zone, a biasing element biasing the damper toward an open position permitting air to flow from the ducting into each zone, and a motor coupled to each damper for closing each damper, and a first relay including a set of normally closed contacts coupled to the damper motor and to a source of power sufficient to close the damper, the first relay also including a coil coupled to the heating and cooling signal outputs of the thermostat in said zone so that the initiation of a heating or cooling signal by the thermostat in the selected zone opens the normally closed contacts of the first relay removing power from the motor coupled to the damper leading to the selected zone thereby permitting the damper to open under influence of the biasing element, the control assembly also comprising:

at least one second relay including a set of normally closed contacts coupled between all the signal outputs of a first type selected from the group consisting of heating and cooling and a control unit controlling the application of power to the temperature modifying unit of the same type, the at least one second relay also including a coil coupled to the signal output of the opposite type of all the thermostats so that initiation of a signal from a selected one of the heating or cooling signal outputs of any of the thermostats prevents the application of power to the temperature modifying unit of the opposite type.

13. The control assembly of claim 12 further comprising a third relay including a set of normally open contacts coupled between said source of power and said set of normally closed contacts on all the first relays, the third relay also including a coil coupled to the heating signal output of all the thermostats so that initiation of a signal from a heating signal output of any of the thermostats applies power from said source of power to the normally closed contacts on all the first relays.

14. The control assembly of claim 13 wherein said third relay further comprises a set of contacts coupled to said fan and to a source of power so that a flow of air through said ducting is caused by said fan whenever any of the thermostats initiate a heating signal.

15. The control assembly of claim 12 wherein said control unit controlling the application of power to the cooling unit further comprises a fourth relay including a set of normally open contacts coupled between said source of power and said set of normally closed contacts on all the first relays, the fourth relay also including a coil coupled to the cooling signal output of all the thermostats so that initiation of a signal from a cooling signal output of any of the thermostats applies power from said source of power to the normally closed contacts on all the first relays.

16. The control assembly of claim 15 wherein said fourth relay further comprises a set of contacts coupled to said fan and to a source of power so that allow of air through said ducting is caused by said fan whenever any of the thermostats initiate a cooling signal.

17. The control assembly of claim 12 further comprising a fifth relay including a first set of normally closed contacts in each zone coupled between the first relay coil and the cooling signal output, a second set of normally open contacts in each zone coupled between the first relay coil and the heating signal output so that the first relay coil cannot simultaneously receive output signals from both the heating signal output and cooling signal output.

18. The control assembly of claim 12 further comprising a venting signal output on each of said thermostats, and a sixth relay including a set of contacts coupled to said fan and to a source of power sufficient to cause a flow of air through said ducting, the sixth relay including a coil coupled the venting signal output on all of said thermostats so that air is caused to flow through said ducting when a venting signal is output from any of the thermostats.

19. The control assembly of claim 12 wherein another of said at least one second relays includes a set of contacts coupled between all the signal outputs of a second type and a control unit controlling the application of power to the second type temperature modifying unit, and also includes a coil coupled to the signal output of said first type of all the thermostats so that initiation of a signal from a first type signal output of any of the thermostats prevents the application of power to the second type temperature modifying unit, and a switch for exclusively selecting which of said at least one second relays is to be operative.

20. A control assembly for controlling a forced air system including a heating unit, a cooling unit, a fan, and ducting connected thereto for delivering air, which may be heated or cooled, to a plurality of zones within a structure, the control assembly comprising a plurality of zone controls, each zone control comprising:

a damper situated in an outlet of said ducting leading to each zone, a biasing element biasing the damper in a normally open position permitting air to flow from the ducting into each zone, and a motor coupled to each damper for closing each damper, a thermostat situated in each of said zones including at least a heating signal output and a cooling signal output, the control assembly also comprising:

a pair of relays including a set of normally open contacts coupled between said motors coupled to each damper and a source of power sufficient to close the dampers, one of the pair of relays having a coil coupled to the heating signal outputs of all of the thermostats and another of the pair of relays having a coil coupled to the cooling signal outputs of all of the thermostats so that, upon initiation of a heating or cooling signal from any of the thermostats, power is applied the motor coupled to each damper for closing each damper, a first additional relay means including sets of normally closed contacts, each set of normally closed contacts being coupled between a damper motor in one of the zones and said source of power, the first additional relay means also including a coil coupled to the heating and cooling signal outputs of the thermostat in said one of the zones so that the initiation of a heating or cooling signal by the thermostat in said one of the zones opens the normally closed contacts of the first additional relay means thus preventing power controlled by said pair of relays from being applied to the motor coupled to the damper leading to said one of the zones thereby permitting the damper to remain open under influence of the biasing element, and at least one second additional relay including a set of normally closed contacts coupled between all the signal outputs of a first type selected from the group consisting of heating and cooling and a control unit controlling the application of power to the temperature modifying unit of the same type, the at least one second additional relay also including a coil coupled to the signal output of a second type of all the thermostats so that initiation of a signal from a selected one of the heating or cooling signal outputs of any of the thermostats prevents the application of power to the temperature modifying unit of the second type.

21. The control assembly of claim 20 further comprising yet another relay including a first set of normally closed contacts in each zone coupled between the first relay means coil and the cooling signal output, a second set of normally open contacts in each zone coupled between the first relay coil and the heating signal output so that the first relay coil cannot simultaneously receive output signals from both the heating signal output and cooling signal output.

22. The control assembly of claim 20 wherein said pair of relays each further comprise a set of contacts coupled to said fan and to a source of power so that a flow of air through said ducting is caused by said fan whenever any of the thermostats initiate a heating or a cooling signal.

23. The control assembly of claim 20 further comprising a venting signal output on each of said thermostats, and a fan control relay including a set of contacts coupled to said fan and to a source of power sufficient to cause a flow of air through said ducting, the fan control relay including a coil coupled the venting signal output on all of said thermostats so that air is caused to flow through said ducting when a venting signal is output from any of the thermostats.

24. The control assembly of claim 20 wherein another of said at least one second relays includes a set of contacts coupled between all the signal outputs of the second type and a control unit controlling the application of power to the second type temperature modifying unit, and also includes a coil coupled to the signal output of said first type of all the thermostats so that initiation of a signal from a first type signal output of any of the thermostats prevents the application of power to the second type temperature modifying unit, and a switch for exclusively selecting which of said at least one second relays is to be operative.

* * * * *